(12) United States Patent
Wobben (10) Patent No.: US 7,878,742 B2
(45) Date of Patent: *Feb. 1, 2011

(54) DEVICE FOR HANDLING UNIT LOADS

(76) Inventor: Aloys Wobben, Argestrasse 19, Aurich (DE) 26607

( * ) Notice: Subject to any disclaimer, the term of this patent is extended or adjusted under 35 U.S.C. 154(b) by 305 days.

This patent is subject to a terminal disclaimer.

(21) Appl. No.: 12/129,234

(22) Filed: May 29, 2008

(65) Prior Publication Data

US 2008/0232920 A1 Sep. 25, 2008

Related U.S. Application Data

(63) Continuation of application No. 10/332,788, filed as application No. PCT/EP01/07896 on Jul. 9, 2001, now Pat. No. 7,594,785.

(30) Foreign Application Priority Data

Jul. 10, 2000 (DE) ................. 100 33 238
Dec. 18, 2000 (DE) ................. 100 63 136

(51) Int. Cl.
*B61D 3/14* (2006.01)
(52) U.S. Cl. .............. 410/53; 410/44; 410/47; 410/54; 410/80; 410/82; 294/67.3; 414/458; 414/460; 414/910
(58) Field of Classification Search ............. 414/458, 414/459, 460, 461, 563, 910, 911; 410/44, 410/45, 47, 53, 54, 80, 82; 294/67.1, 67.3
See application file for complete search history.

(56) References Cited

U.S. PATENT DOCUMENTS 3,086,807 A 4/1963 Russell et al. ............ 294/67

(Continued)

FOREIGN PATENT DOCUMENTS

AU 22 037 70 5/1972

(Continued)

OTHER PUBLICATIONS

"Deutsche Hebe- und Fördertechnik," No. 5/1968, pp. 76-80.

(Continued)

*Primary Examiner*—Michael S Lowe
(74) *Attorney, Agent, or Firm*—Seed IP Law Group PLLC (57) ABSTRACT

The present invention relates to a device for gripping a unit load during handling of same, said device comprising an attachment portion for attaching the device to the unit load, a gripping portion (for engaging with a handling means) which is embodied in the form of a container corner, and a set of at least two said gripping devices adapted in a certain way to the unit load or at least to elements of the unit load. The invention also relates to a transport vehicle for the unit load, comprising a towing vehicle and a trailer that are connected to each other via the unit load during transportation thereof, and which have holding devices for the unit load on their facing ends, comprising a set of said gripping devices. The holding devices comprise container brackets, the arrangement of said container brackets being adapted to the unit load or at least to elements of the unit load, by means of gripping devices adapted and fastened to said unit load, in such a way that the container brackets can clamp onto the container corners of the devices fastened to the unit load.

17 Claims, 9 Drawing Sheets

U.S. PATENT DOCUMENTS

| | | | |
|---|---|---|---|
| 3,253,668 A | 5/1966 | Tantlinger | 180/11 |
| 3,631,999 A | 1/1972 | Walerowski | 214/390 |
| 3,767,071 A | 10/1973 | Harbers | 214/152 |
| 3,929,241 A | 12/1975 | Putnam | 214/390 |
| 4,452,555 A | 6/1984 | Calabro | 410/53 |
| 4,570,959 A | 2/1986 | Grinwald | 280/43.23 |
| 4,925,349 A | 5/1990 | Yurgevich | 410/54 |
| 4,961,680 A | 10/1990 | Reidl et al. | 414/458 |
| 5,997,228 A | 12/1999 | Potter | 410/155 |
| 6,047,989 A | 4/2000 | Wood | 280/789 |
| 6,210,088 B1 | 4/2001 | Crosby | 410/35 |
| 6,422,795 B2 | 7/2002 | Holt et al. | 410/115 |
| 7,594,785 B2 * | 9/2009 | Wobben | 410/53 |

FOREIGN PATENT DOCUMENTS

| | | |
|---|---|---|
| CH | 306746 | 4/1955 |
| DE | 1 136 902 | 9/1962 |
| DE | 61 210 | 4/1968 |
| DE | 64 800 | 11/1968 |
| DE | 74 01 022 U | 4/1974 |
| DE | 92 04 661 U1 | 7/1992 |
| DE | 298 16 463 U1 | 12/1998 |
| WO | WO 97/48636 | 12/1997 |

OTHER PUBLICATIONS

"Deutsche Hebe- und Fördertechnik," No. 4/1970. pp. 71-72.

* cited by examiner

DEVICE FOR HANDLING UNIT LOADS

CROSS REFERENCE TO RELATED APPLICATIONS

The present application is a continuation of and claims priority under 35 U.S.C. §120 from and commonly owned U.S. patent application Ser. No. 10/332,788, entitled "DEVICE FOR HANDLING UNIT LOADS," filed Jul. 16, 2003, issued Sep. 29, 2009 as U.S. Pat. No. 7,594,785, which is a national stage application of Patent Cooperation Treaty (PCT) Application No. PCT/EP01/07896, filed Jul. 9, 2001, which in turn claims priority from German Application Nos. DE 100 33 238.2, filed Jul. 10, 2000 and DE 100 63 136.3, filed Dec. 18, 2000.

TECHNICAL FIELD

The present invention relates to a device for gripping a unit load during handling of same, said device comprising an attachment portion for attaching the device to the unit load and a gripping portion for gripping a handling means.

BACKGROUND OF THE INVENTION

Standardized containers have long been used to great advantage for the transportation of goods. At their corners, these containers have facilities, referred to as container corners or twist blocks, that project beyond the sides of the container therebetween by a certain amount. Said container corners are designed in such a way that standardized holders can engage with and be locked into said container corners.

Goods of large volume (referred to hereinafter as unit loads) cause substantial problems during handling or transportation when they are unsuitable for containerized transport, for example on account of their dimensions and/or weight. Such unit loads can be steel towers or tower segments, for example, which must often be transported as supports for telecommunications facilities or wind turbines. Such sections are usually 11-25 meters in length, up to 4 meters in diameter and between 20-70 tons in weight. These figures may even be exceeded.

In the following, the invention and the problems encountered in the prior art are described with reference to such steel tower segments. However, attention is expressly drawn to the fact that the invention is not confined to such applications and that it essentially relates to any kind of unit load.

As is well known, steel tower sections present a series of handling and transportation tasks, beginning with manufacture and continuing through transportation to the construction site and to erection of the edifice.

Both ends of the mostly circular cylindrical tower segments are usually fitted with flanges with which the separate sections are connected during erection. Said flanges are also used in most cases to attach the handling or transportation means to the section.

Such means are rotary adapters, for example, by means of which the sections horizontally aligned along their longitudinal axis can be turned about their longitudinal axis, in order, for example, to perform paint finishing work at any part of the outer wall. These rotary adapters are fastened with screws to the flanges.

By this method, for example, feet are screwed onto the flanges to enable the section to be stored with a predetermined clearance from the ground. As soon as the feet are attached and the section has been laid down, the rotary adapters are removed. The feet are positioned in such a way that there is a certain probability that they still fit and do not have to be refitted when the section is later transported by truck.

When the sections are smaller, they can be transported by truck on a low loader.

However, a so-called boiler bridge is required in the case of larger sections. Such a boiler bridge comprises a traction unit with a low loader mounted thereto and a rear trailer, said low loader and trailer being connected to each other by spars and the gap between the two being adjustable within certain limits. When a section is transported using the boiler bridge, on the other hand, different feet must be screwed onto the section in order to hold it in a certain position on the spars of the boiler bridge.

As soon as the section reaches the construction site, hoisting brackets are screw-fastened to the flange of the segment that is to be set upright for assembly. As soon as the section has been raised using the hoisting brackets, the feet are removed from the flange, and the section can be fitted into the tower.

If part of the transportation route is by sea, the feet attached to the section can be welded to the deck of the ship. The feet have to be changed again if the section was transported to the port using a boiler bridge. Although welding the feet is both a simple and effective way of securing the section for transportation, it harbors the risk of the section being damaged when the cargo is discharged—especially when the feet are not separated from the deck of the ship, but simply screwed off the flanges of the section instead. What is more, the feet that are then missing or destroyed have to be replaced by new ones in order to transport the section by truck from the port to the construction site.

As an alternative to welding the feet to the deck of the ship, the sections are secured by chains, for example, which are fed either through the holes in the section or around the outside of the section and then made fast. In order to hold the heavy section in a reliable way, the chains are tightly lashed. This can easily lead to deformations in the section, or damage to the coating, for example. If a boiler bridge is ready for use in the destination port, it is necessary to change the feet once again.

Well known devices are integral elements with two portions, one of which is for fastening the device to the unit load and the other for operation during handling (e.g., hoisting or laying down).

In the devices described, the frequent, time-consuming and hence cost-intensive refittings for the various carrying, support and hoisting procedures during handling of the section in the manufacturing process and during transportation are severe disadvantages. Each device is essentially designed for one task only and for one function only.

One transportation variant on land is a so-called transportation cross. The latter comprises a traction unit and a trailer. The linkage between the two vehicles is provided by the item to be transported—i.e., the tower section, for example. Holding devices that can be screwed to the flanges of the section are disposed on the traction unit and on the trailer.

Assembly and disassembly of the section between the traction unit and the trailer takes a disadvantageous 2.5 to 3 hours in each case, during which time the section must be held by a crane. Use of both the crane and the personnel required is therefore blocked for a very long time.

SUMMARY OF THE INVENTION

One object of the present invention is therefore to provide universally deployable handling means for unit loads, in particular for the production, transportation and assembly of such unit loads.

According to the invention, a gripping portion of a gripping device for a unit load is embodied in the form of a container corner, that is to say a standard container bracket. Given that such container corners are the standardized interfaces for hoisting and handling containers, and a substantial portion of all military and commercial logistics worldwide is effected with containers, all the relevant and requisite handling and transportation facilities are available worldwide in order to handle and transport unit loads fitted with such appliances.

In one preferred embodiment of the invention, an attachment portion of the gripping device pursuant to the invention has attachment facilities that are designed to match the unit loads to which the device is to be attached. If the unit load has attachment holes in a flange, for example, then the attachment portion may also have attachment facilities, e.g., in the form of through holes with identical spacing to those on the flange. It is therefore possible to attach the device securely to the unit load in a fast and uncomplicated manner.

In another preferred embodiment, the gripping device according to the invention has an indentation that is provided with plate-shaped elements. These are preferably arranged at right angles to each other (and preferably vertical to the plate-shaped base member of the gripping device), such that the indentation is confined on two sides by said plate-shaped elements and is shaped as an indentation. To transport the unit load using a boiler bridge, the unit load can be supported on the spars of the boiler bridge by means of these indentations fitted with plates, in that the indentations conform to the shape of the—otherwise parallel—spars and cradle them. In the case of spars with lying rectangular cross-section, for example, the plates are oriented in such a way that one lies horizontally on one spar and the respective other plates lies across opposite sides of the spar for laterally securing the unit load.

In a preferred configuration of the invention, the gripping portion is spaced at a distance from the attachment facilities, and in the attachment device area at least one additional attachment facility is provided to which additional cross-members, for example, can be attached within the boundaries of the unit load if the grip device according to the invention is accordingly fitted.

Eyes can also be provided on the grip device according to the invention, to which tarpaulins, for example, can be attached in order to cover the unit load.

According to the invention, an adapter for receiving a unit load is also provided, said adapter comprising a support to and/or in which connector elements are disposed that can be connected to the gripping portion of the appliances according to the invention, which take the form of container corners. This makes it possible, in the case of very heavy unit loads, to distribute the weight over a larger surface via a support, in that the support has a level supporting surface, for example.

In one preferred embodiment, the adapter has four connector elements that are disposed alongside each other on the support, preferably in the form of a straight beam, and of which at least two have a certain spacing between each other. If the spacing between said connector elements according to the invention is equal to that of a standardized container dimension, said two fixedly spaced connector elements permit the adapter to be attached in standardized holders, such as those found, for example, on container trucks or on the container decks of ships.

The remaining connector elements may be set or even adjusted to a spacing that permit unit loads to be fastened, by means of gripping devices according to the invention, with a different spacing to that between the standardized holders. If the outer connector elements have the standard spacing, the inner connector elements can hold a unit load with gripping devices with a smaller spacing between them than the standard spacing. If the inner connector elements have a standard spacing between them, then the outer connector elements hold the unit load, which is fitted with devices that have a greater spacing between them than the standard spacing.

Alternatively, all connector elements can have predefined spacings between them, such that the adapter matches certain unit loads, or unit loads with certain dimensions, and can be used immediately without adaptation being necessary.

The invention also relates to a transport means with a towing vehicle and a trailer, wherein the towing vehicle and trailer are connected during transportation by the unit load, and the towing vehicle and trailer have devices at the ends facing each other for holding the unit load.

The transport means is preferably so configured that the holding devices have certain connector elements, so-called container brackets, at which the unit load can be quickly and easily fastened to the transport means with the gripping devices according to the invention that are attached to the unit load.

The transport means can have fixed, predefined spacings between the container brackets, or the holding devices can be adjustable in their height and/or their width. The container brackets are then attached to the adjustable portions of the holding devices. The holding devices are preferably adjusted by hydraulic means, in particular, such that they can be easily adjusted to the dimensions of the item to be transported. The transport vehicle for a unit load, comprising a towing vehicle and a trailer, preferably has matching connector elements at the ends of said towing vehicle and trailer that face each other. Said matching connecting elements are arranged relative to each other in such a way that the towing vehicle and the trailer can be directly connected to each other. Thus, if the transport vehicle is not loaded with a unit load (and hence there is no unit load to join the towing vehicle and the trailer), the towing vehicle and the trailer are connected by the connector elements according to the invention in such a way that the resultant entity can be driven. In this way, a drivable entity with the shortest possible length can advantageously be formed in accordance with the invention, said entity being easy to maneuver like a single vehicle on account of the substantially rigid link between the towing vehicle and the trailer—and not difficult to maneuver like the traction unit with the trailer connected by the tow-bar, as in the prior art.

The connector elements can have spars oriented horizontally in the direction of travel, said spars being lying one above the other in order to connect the towing vehicle and the trailer, with preferably level flange surfaces that may, for example, be horizontal. To secure the connection, the connector elements may have bolts that engage with matching holes on the other side with clearance fit. Such connector elements with matching fit are preferred according to the invention, because they can be connected together in a particularly fast manner. Furthermore, an essentially rigid connection between the traction unit and the trailer can then be achieved preferably by means of clamping elements such as simple ratchet tighteners or bracing belts or threaded tension jacks attachable between the towing vehicle and the trailer, for example to lugs, and which can clamp the traction unit and the trailer to each other also in such a way that the interlocking connection in the example is secured against loosening.

BRIEF DESCRIPTION OF THE DRAWINGS

Yet other advantageous embodiments of the invention are described in the following with reference to the attached figures.

DETAILED DESCRIPTION OF THE INVENTION

Figure 1A:
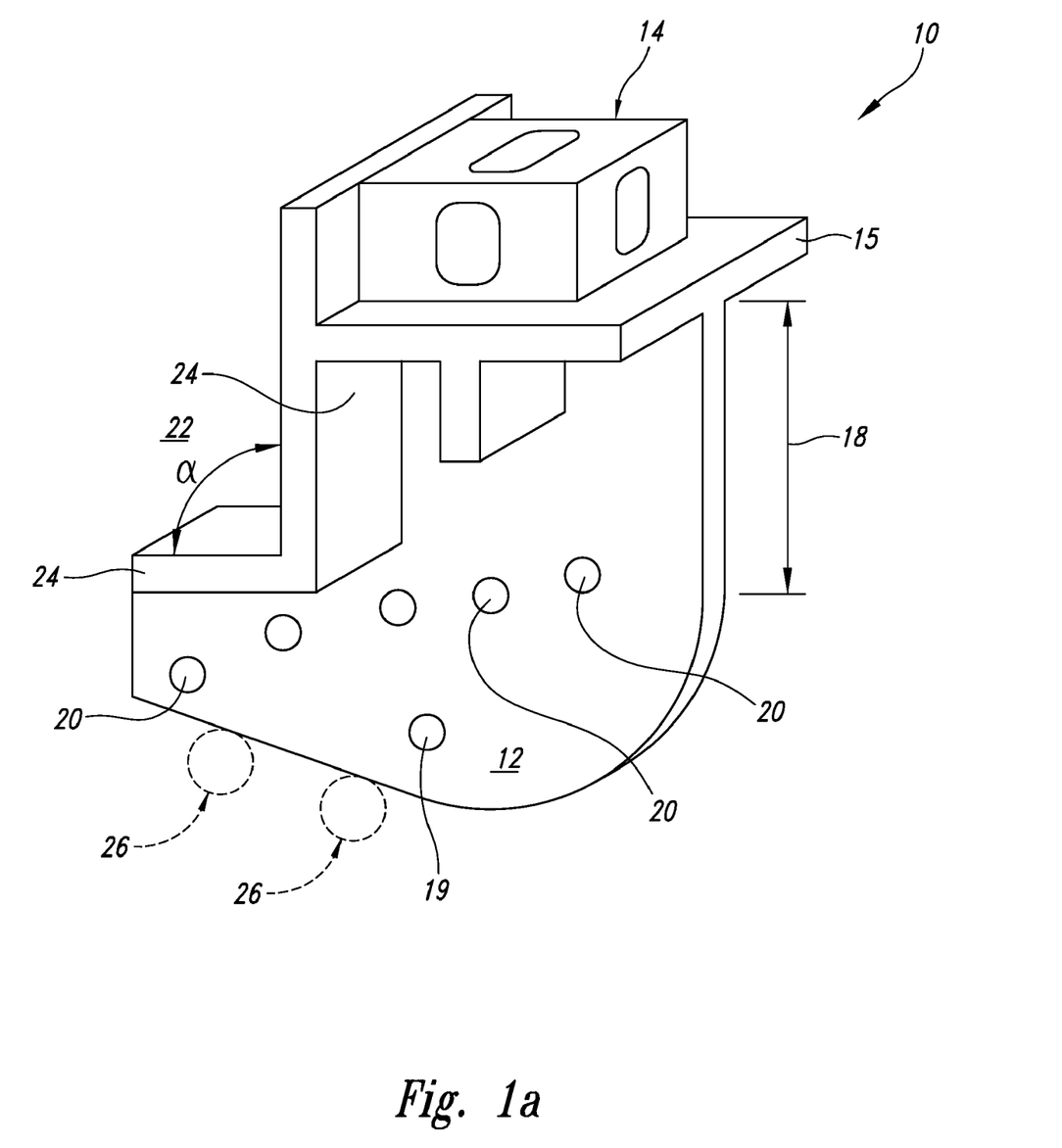
FIG. 1a is a three-dimensional view of a gripping device according to the invention.

FIG. 1a shows, in a three-dimensional view, a first embodiment of a gripping appliance 10 according to the invention. Device 10 comprises an attachment portion 12 and a gripping portion 14 attached thereto. The attachment portion 12 has holes 20 as attachment facilities with which the gripping devices 10 can be fastened to the unit load 16 (not shown in this figure) in a certain position, preferably by screw connections.

An essential feature here is the spatial orientation, in particular the distance 18 between the attachment facilities 20 and the gripping portion 14, in that this also results, for example, in the spacing between the unit load 16 (not shown in this figure) and a level base, when the unit load is set on the ground with a set of gripping devices 10 as feet.

Because the invention with its advantages is also illustrated here in the description of the figures, for the example of a circular cylindrical section 16 of a steel tower with circular ring-shaped flanges at both ends thereof, the attachment facilities 20 (through holes) adapted to said flanges are arranged in a pattern with curved center line. When the spacing between the holes is identical, the device (10) according to the invention can be fastened to a flange of the section 16.

According to the invention, the gripping portion 14 is a so-called container corner. Said container corner is fixed to a support plate 15. Due to the fact that no element of the gripping device projects beyond the container corner, the gripping device can serve as a hoisting point for appropriate hoisting means such as container gantries or container spreaders, and as a foot for setting down the unit load.

Owing to the possibility of using standardized fixing means for containers, it is no longer necessary to weld the feet to a ship's deck, for example. One can also dispense with lashing down the unit load with chains as a way of securing it during transportation by ship.

Two plates 24 are attached in an indentation 22 in the attachment portion 12. Said plates are at an angle of α to each other and demarcate the sides of indentation 22. The plates each run vertically to the surface of attachment portion 12. In this way, the devices according to the invention can also be adapted as a set for setting the unit load 16 down on a boiler bridge and for cradling the support spars of the boiler bridge by conforming to their shape.

Figure 1B:
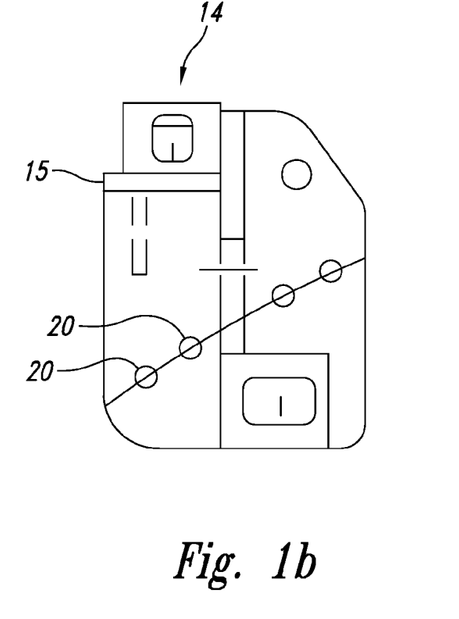
FIG. 1b-c is a front view and side elevation view of an alternative embodiment of a gripping device according to the invention.
Figure 1C:
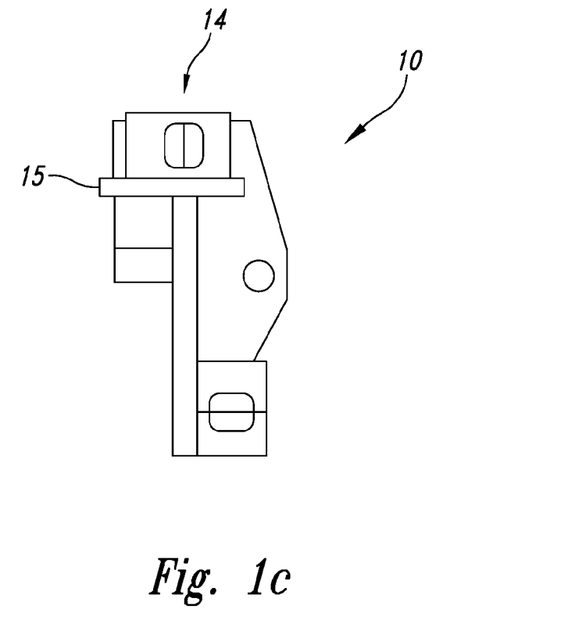
Figure 1D:
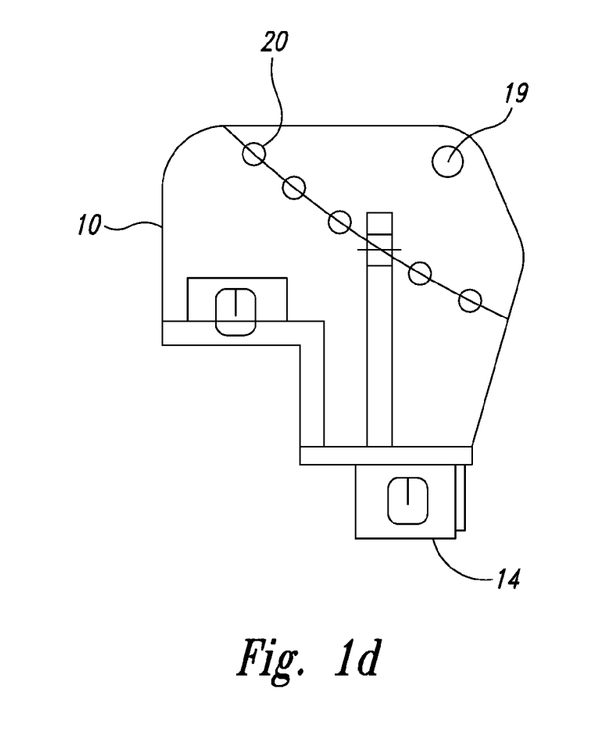
FIG. 1d-e is a front view and side elevation view of another alternative embodiment of a gripping device according to the invention.
Figure 1E:
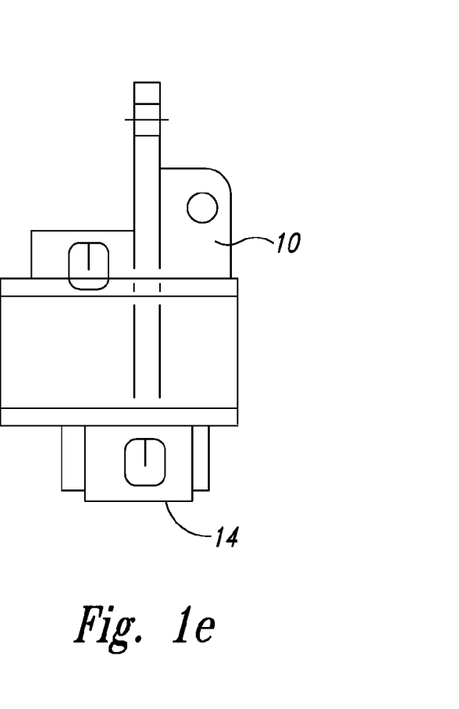

FIGS. 1b-e show alternative embodiments of a gripping device 10. Here, the features described with reference to FIG. 1a are differently proportioned and positioned in relation to each other—e.g., by adapting to a differently dimensioned and/or configured transportation load (not shown). FIG. 1c is the side elevation view of FIG. 1b and FIG. 1e is the side elevation view of FIG. 1d, whereby FIGS. 1b and 1d each show a front view.

Figure 2:
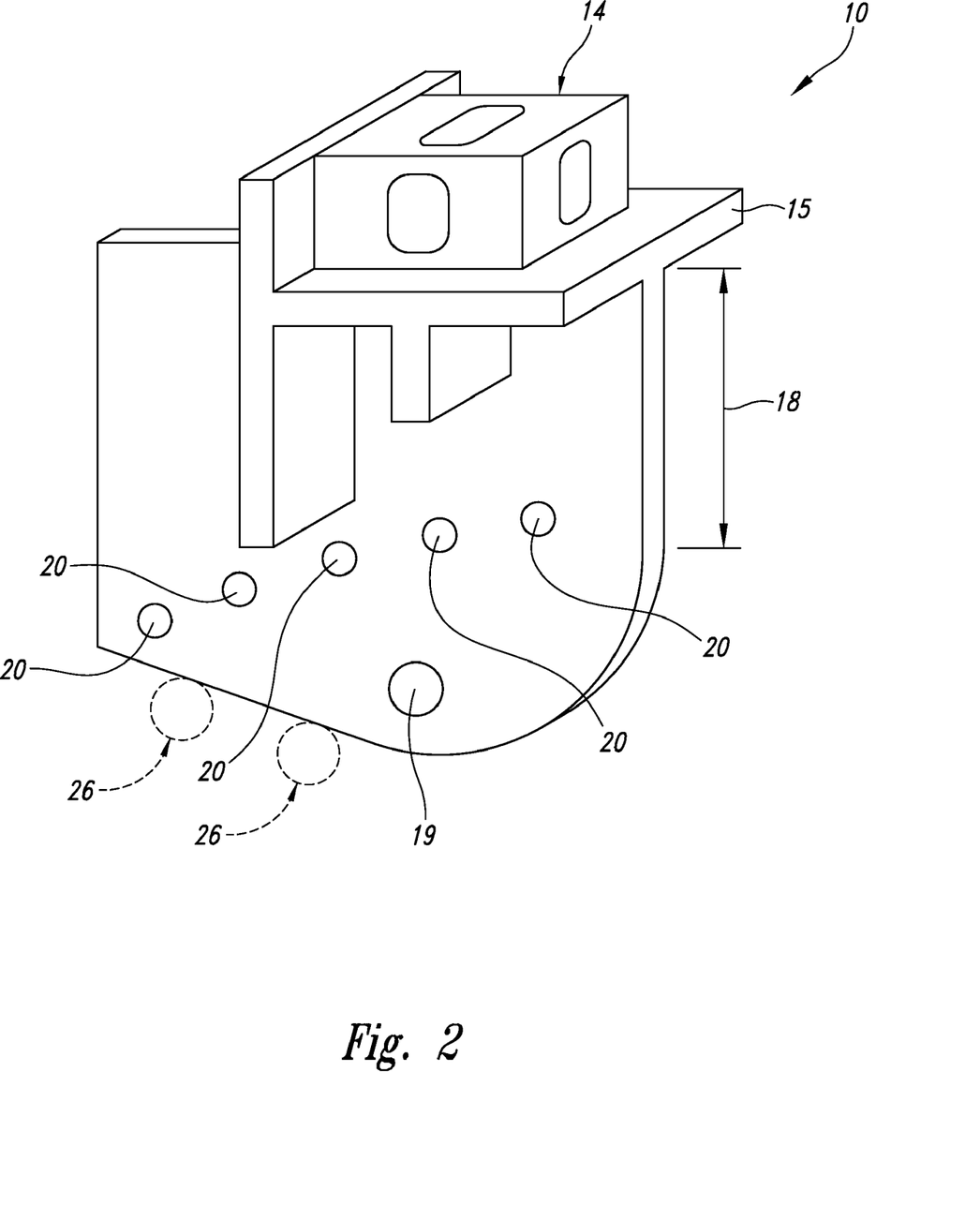
FIG. 2 is a three-dimensional view of another alternative gripping device according to the invention.

FIG. 2 shows yet another embodiment of a device according to the invention. One significant difference to the device shown in FIG. 1a consists in the fact that indentation 22 is not formed (as was already the case in FIGS. 1b-c). Furthermore, the portion between the attachment portion and the gripping portion is embodied in a shortened form. This embodiment cannot, therefore, be used as a foot for setting down the unit load on level ground, if, with the same fixing position of the gripping devices and the same diameter of the unit load, the outer contours of the unit load project beyond a conceived connection line between the gripping portions of two gripping devices. However, the device can easily be used as a hoisting point for the unit load if it is attached to an upper edge of the unit load.

Devices 10 shown in FIG. 1 and FIG. 2 each have an additional attachment facility 19 at or in their first portions 12. Said attachment facility is configured here as a through hole, and other fixtures, for example stiffening struts, can be attached hereto (cf. FIG. 4).

Figure 3:
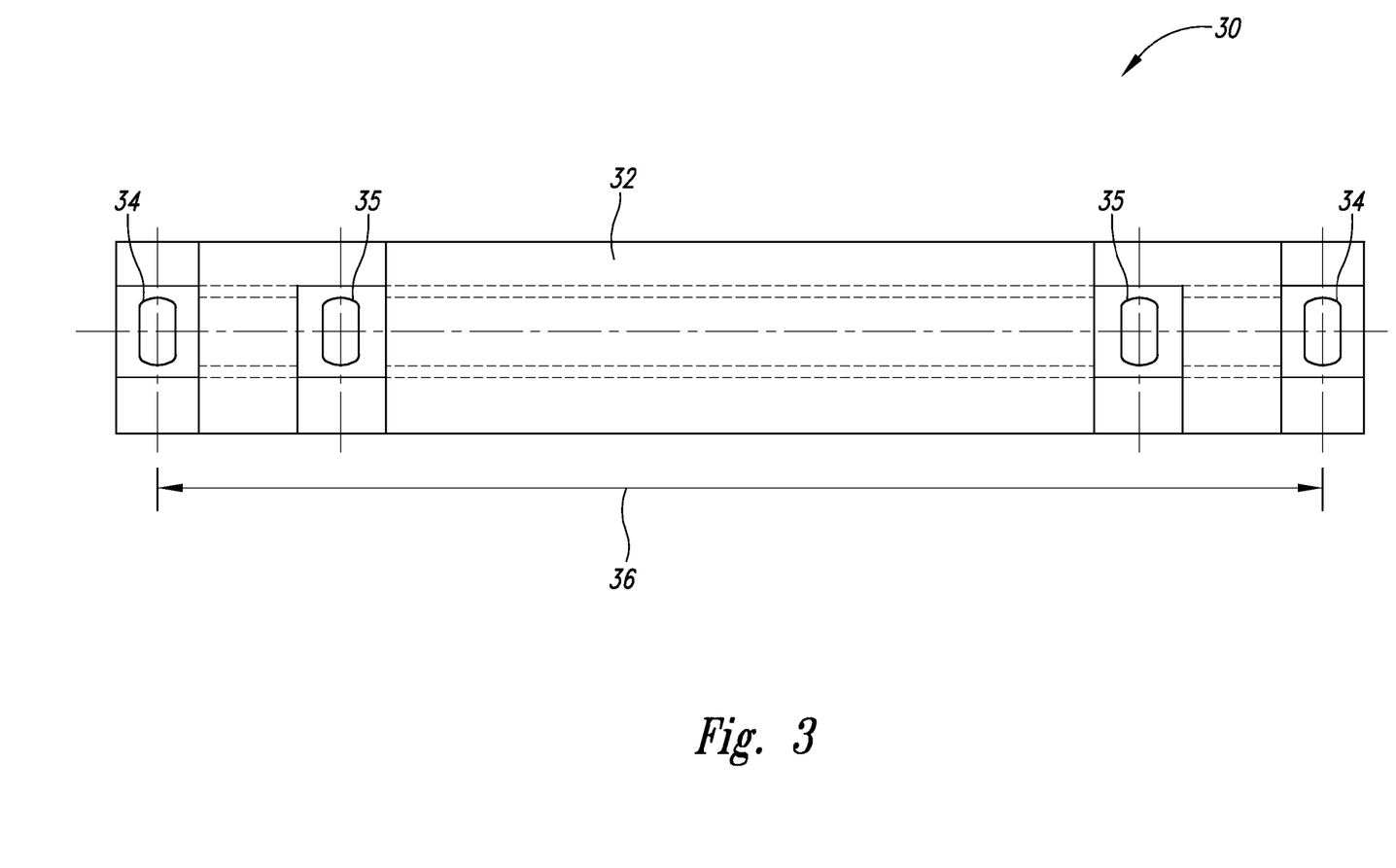
FIG. 3 is a plan view of an adapter according to the invention.

FIG. 3 shows an adapter 30 according to the invention, comprising a total of four container corners as outer connector elements 34 and inner connector elements 35 mounted on a support 32. These outer and inner connector elements 34, 35 are in fixed positions on the support 32. The spacing 36 between the two outer container corners 34 is equal to the standard dimension of 2260 mm from center to center. The spacing between the two inner connector elements 35 is smaller. This means that unit loads onto which the gripping devices 10 according to the invention are attached with a smaller spacing than the standard 2260 mm due to the unit loads being of smaller dimensions can nevertheless be handled and transported by means of adapter 30 using standardized facilities for container handling and transportation.

Alternatively, in the case of a longer support 32, the inner connector elements 35 can have the standard spacing of 2260 mm and the outer connector elements 34 can then receive unit loads that only permit gripping devices 10 of the invention to be fitted at points beyond this standard dimension.

Figure 4:
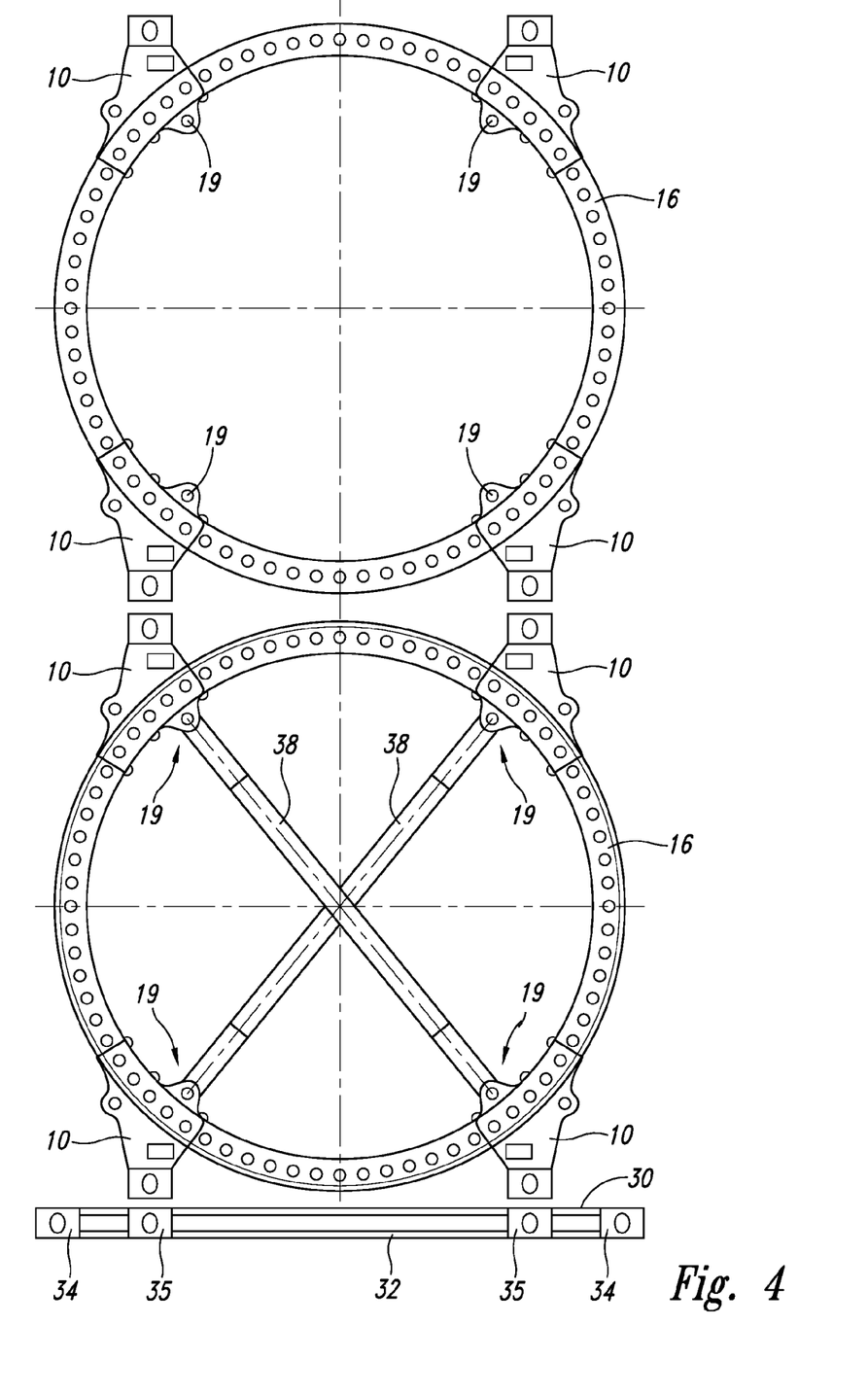
FIG. 4 is a front view of a set of gripping devices according to the invention, with the adapter of the invention attached to two tower segments as transportation load.

FIG. 4 shows one application of the devices 10 and an adapter 30 pursuant to the invention. The sections of a steel tower, shown as unit loads 16, are fitted with a set of gripping devices 10 and stacked one above the other. Due to their relatively 'small' diameter, it is not possible to fit devices 10 with a spacing of 2260 mm between the centers of the container corners 14 of devices 10. Devices 10 are attached with a smaller spacing between their centers.

In order to enable the advantageous use of standardized facilities and transport means despite this smaller spacing, an adapter 30 is additionally provided under the lower section. Said adapter is fitted in such a way that the inner connector elements 35 have the same spacing as the devices/appliances 10 attached to the lower section. The outer connector elements 34 have the standard spacing and thus permit the use of existing facilities and transport means.

In order to provide a secure mechanical connection between the container corners 14 of the set of gripping devices 10 attached to the lower section, on the one hand, and the adapter, on the other, and also between the container corners of the lower section and those of the upper section, standardized connector elements (not shown) are used such as those that are also used on conventional containers to connect their container corners directly with each other.

In the lower section, between the additional, diagonally opposite attachment facilities 19 of the separate gripping devices 10, supports 38 are attached that prevent the lower section from being deformed under the load of the upper section.

Figure 5:
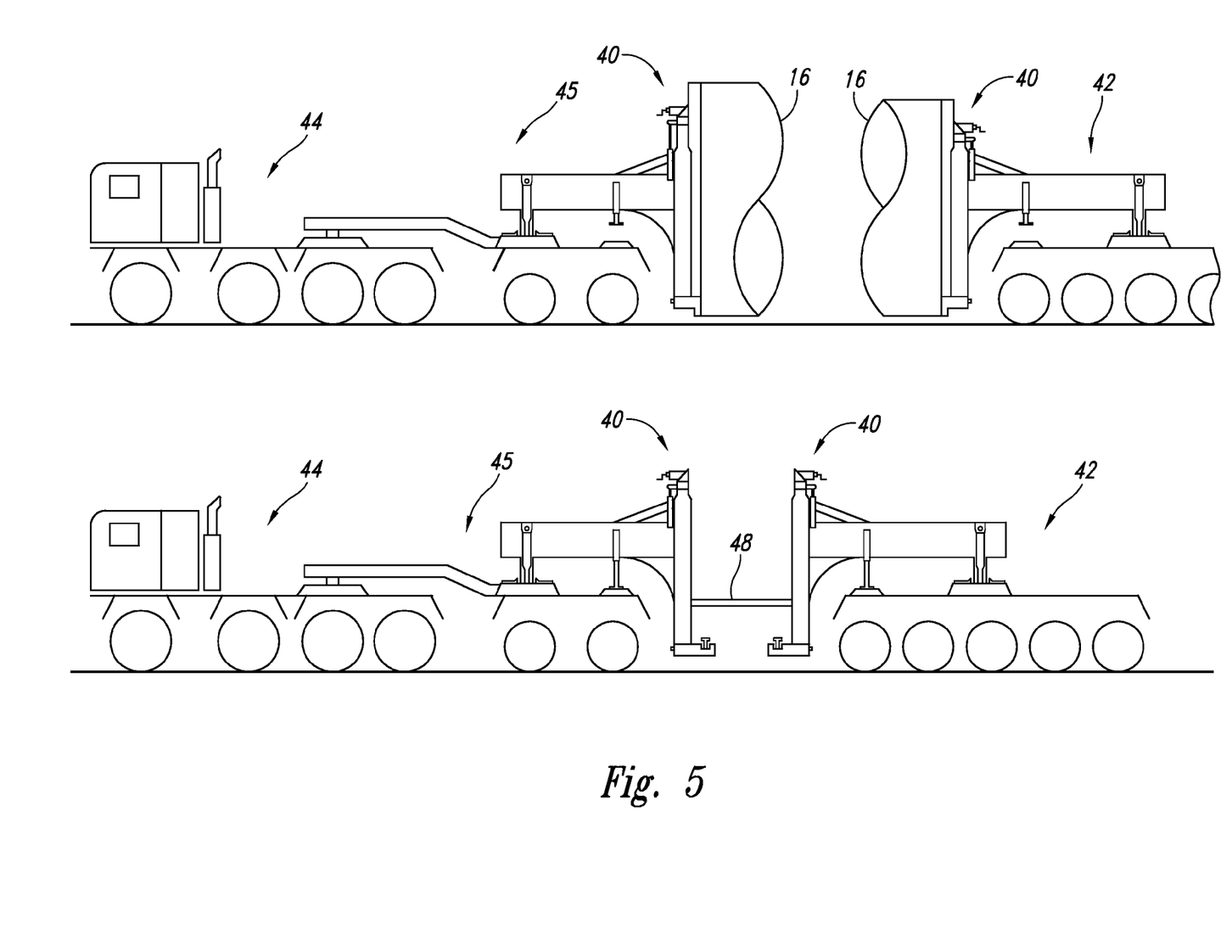
FIG. 5 shows two side elevation views of a transport vehicle according to the invention, with and without transportation load.

FIG. 5 shows transport means according to the invention, comprising a towing vehicle 44, a low loader 45 and a trailer 42. Holding devices 40 for holding the unit load 16 during transportation are disposed on the facing ends of the low loader 45 and the trailer 42. A connection is thus formed via the unit load 16 between the low loader 45 and the trailer 42.

For a trip without a transportation load, the low loader 45 and the trailer 42 are connected by a tow-bar 48 that engages with matching couplings on the low loader 45 and the trailer 42 (bottom of FIG. 5).

Figure 9:
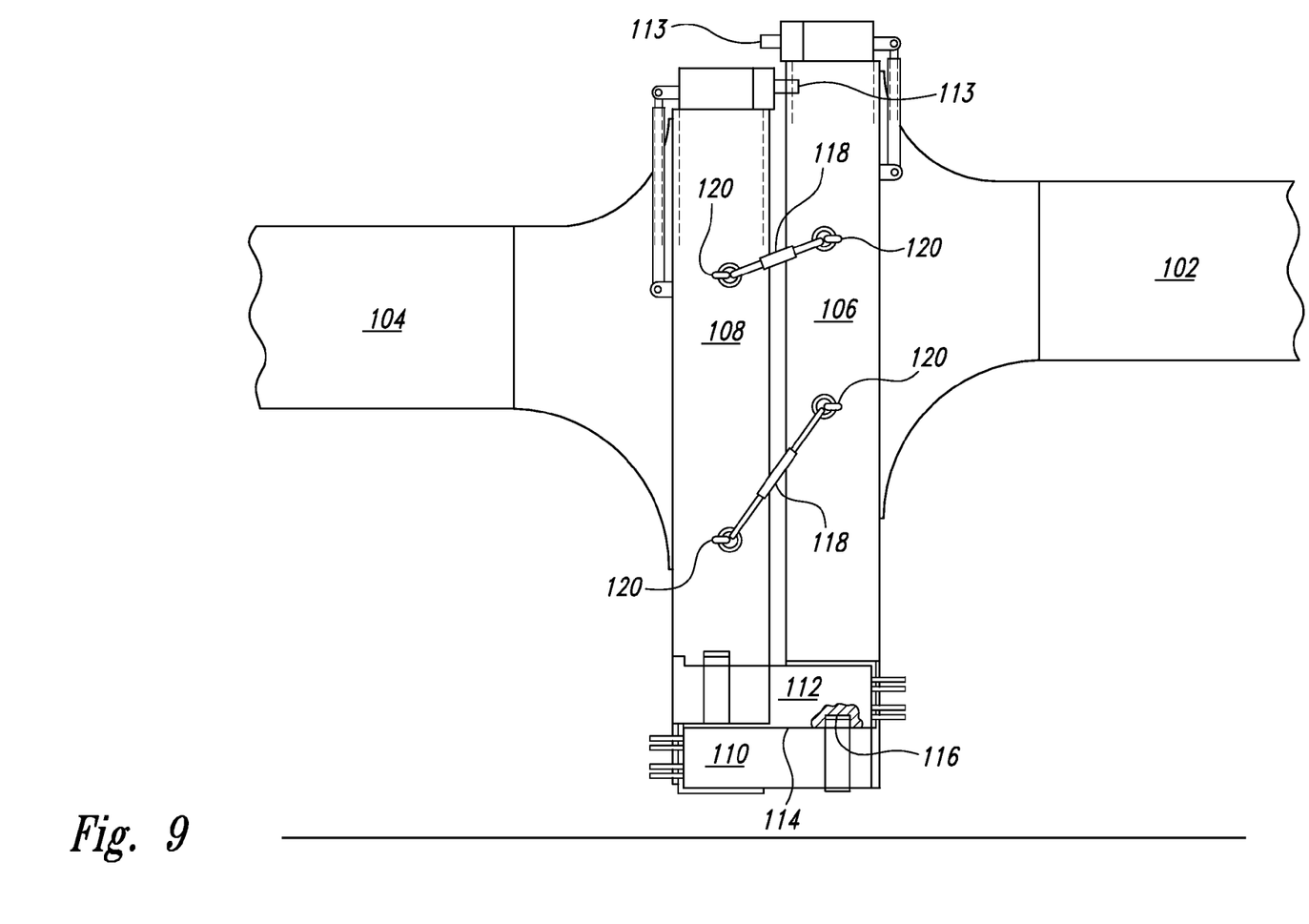
FIG. 9 is a side elevation view of the holding devices of a towing vehicle and a trailer for a unit load, with a connection according to the invention therebetween.

On the right of FIG. 9, a horizontal support spar of the chassis of an alternative transport means comprising a towing vehicle 102 can be seen, and on the left of FIG. 9 a horizontal support spar of the chassis of an associated trailer 104 can be seen, said support spars ending respectively in holding devices 106, 108 for a unit load (not shown). At their lower end, holding devices 106, 108 have spars that project horizontally towards other and which face each other in the direction of travel. Spars 110, 112 are firstly used (like the container brackets 113 at the upper end of holding devices 106, 108) for attaching to a unit load (not shown) when the towing vehicle 102 and the trailer 104 are loaded with the unit load, and secondly, in the unloaded state as shown, for establishing a direct connection between the towing vehicle 102 and the trailer 104. Spars 110, 112 are each disposed as mutually corresponding connector elements in such a way to the holding devices 106 and 108 that they lie one above the other when directly connected, and are connected with horizontal flange surfaces 114 lying congruently one above the other.

Spars 110, 112, which are congruent in shape and form a cooperating connecting structure, have on the one hand a bolt 116 on flange surface 114 of spar 110, said bolt engaging, in the connected position as shown, with a hole 116 in the flange surface 114 of spar 112. This connection 116 formed by conformity of shape is secured by two tensioning elements 118 that are stretched between eyes 120 on the holding devices 106, 108 in such a way that the towing vehicle 102 and the trailer 104 are rigidly clamped to each other.

Figure 6:
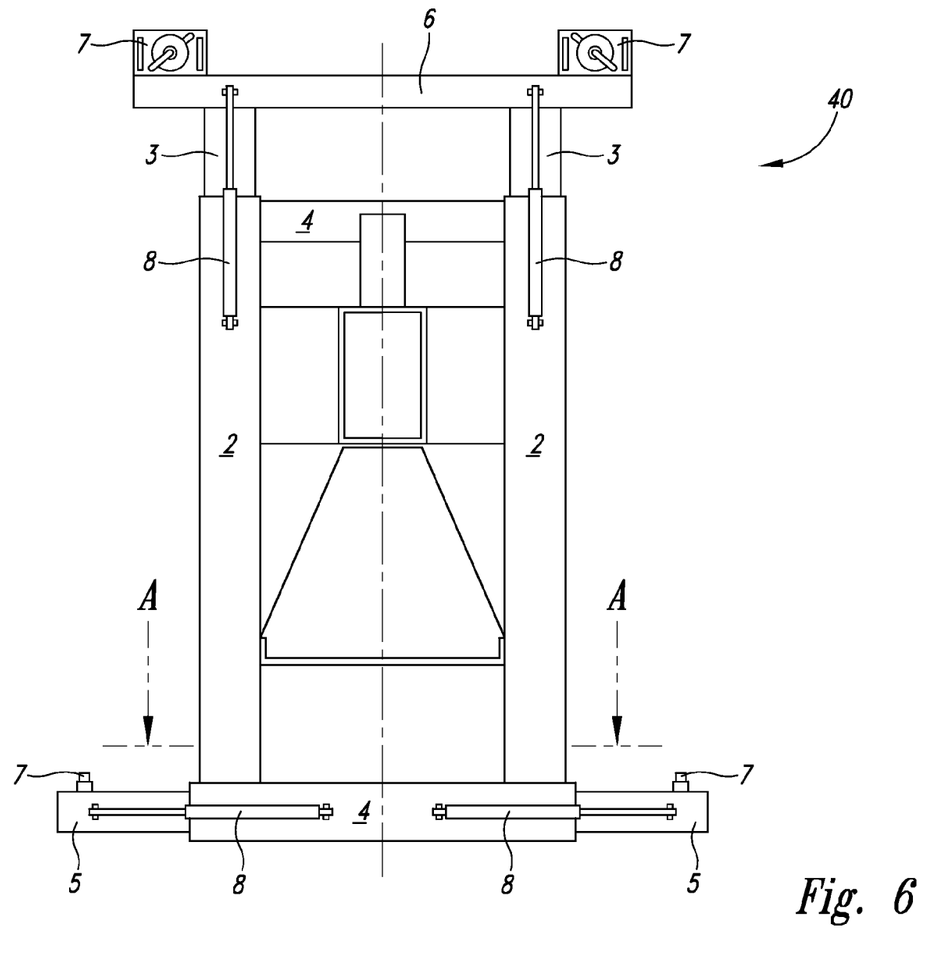
FIG. 6 is a rear view of a holding device of the transport vehicle as defined by the invention.

In FIG. 6, the holding device 40 in FIG. 5 can be seen more precisely in the form of a vertically disposed base frame that has two vertical stays 2 and two horizontal traverses 4. On either side of the lower traverse 4, extension arms 5 with hydraulic cylinders 8 can be telescopically withdrawn and extended in the direction of traverse 4 (horizontally and laterally thereto). In stay 2 there are stay extensions 3 that can similarly be withdrawn and extended with the aid of hydraulic cylinders 8 in the longitudinal direction of stays 2 (vertically upwards). On stay extensions 3 there is then a crossbeam 6, at the outer ends of which container brackets 7—standardized facilities for rapid engagement with container corners—are attached. Additional container brackets 7 are located at the ends of the horizontally and laterally extendable extension arms 5. The position of said extension arms can be seen particularly well in FIG. 7.

Figure 7:
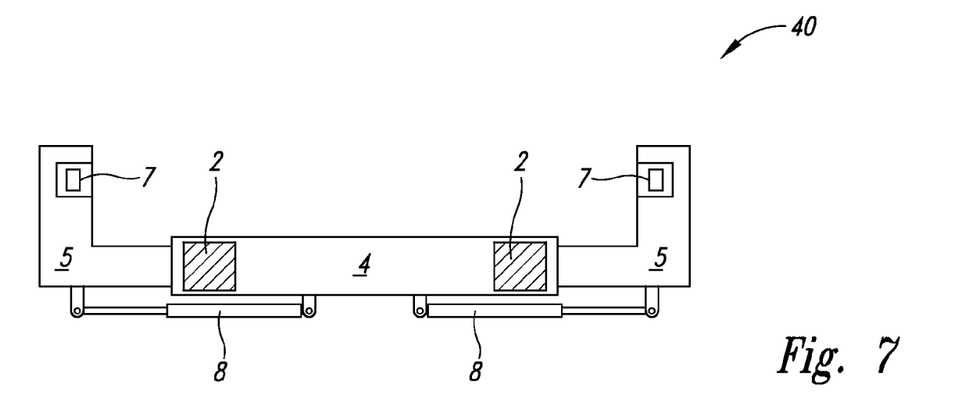
FIG. 7 is a cutaway plan view along line A-A in FIG. 6 of a holding device of the transport vehicle as defined by the invention.

It is also clearly apparent from FIG. 7 that the outer portions of said extension arms 5 run at a right angle to the respective extension arm 5 in the direction of the respective holding device 40 facing the extension arm on the transport vehicle. The container brackets 7 are disposed on said angled portions of extension arms 5 in such a way, therefore, that operating the lower hydraulic cylinder 8 causes the lower container brackets 7 to be laterally displaced. By this means, the holding device 40 according to the invention can be adjusted to the width and/or to the spacing between the devices 10 and the unit load 16.

Figure 8:
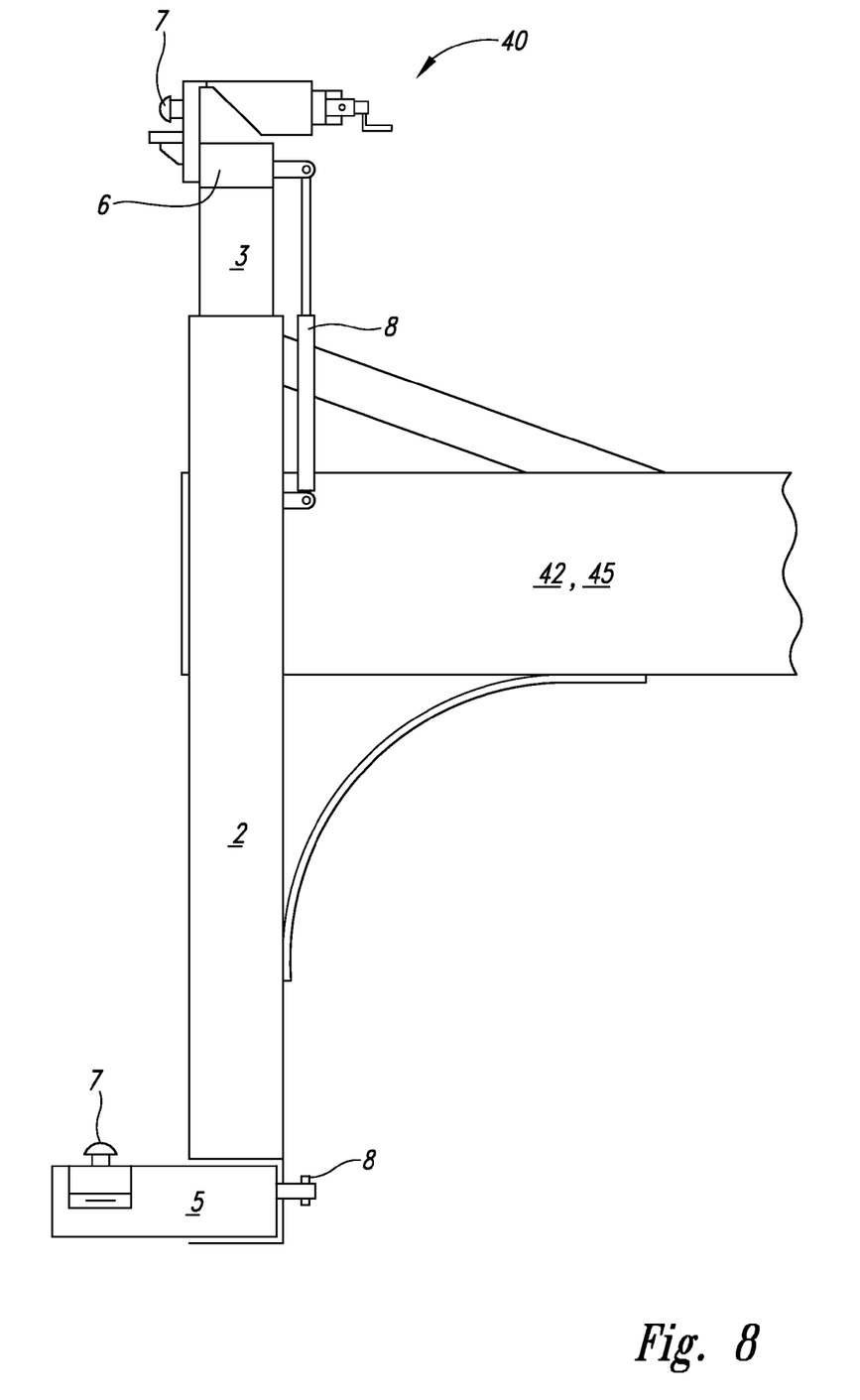
FIG. 8 is a side elevation view of a holding device of the transport vehicle as defined by the invention.

The side elevation view in FIG. 8 also shows the holding device 40 on the low loader 45 and the trailer 42. It can easily be seen from this view that operating the upper hydraulic cylinder 8 causes an extension of the stays 3 and hence a change in the height of the upper container brackets 7 disposed on the crossbeam 6.

The crossbeam 6 can also comprise a plurality of laterally adjacent container brackets 7, or may also enable telescopic adjustment in this direction such that, in addition to hydraulic (or pneumatic) adjustment of height, the horizontal lateral position of the upper container brackets can also be adapted to the transportation load.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A system, comprising:
   a unit load having a flange that includes a pattern of holes;
   a gripping device adapted to grip said unit load, the gripping device including:
      an attachment portion configured to attach said gripping device to said unit load, the attachment portion having at least two holes with a diameter and spacing that correspond to said pattern of holes of said flange of the unit load; and
      a gripping portion formed as a container corner fitting that is adapted to be engaged with and locked into by a handling device; and
   connections fitted into respective each of said at least two holes of said attachment portion and into respective said pattern of holes of said flange of said unit load, so as to attach said gripping device to said unit load.

2. The system of claim 1 wherein said unit load includes a tower segment of a wind power installation.

3. The system of claim 1 wherein said connections include screws.

4. The system of claim 1 wherein said attachment portion includes a third hole, the system further comprising a stiffening strut positioned across said unit load and having an end attached to said gripping device at said third hole of said attachment portion.

5. The system of claim 1 wherein said gripping device, attached to said unit load, provides a foot for said unit load.

6. The system of claim 5, further comprising:
- at least another of said gripping device having a gripping portion formed as a container corner fitting, said at least another of said gripping device being attached to said unit load to provide another foot for said unit load;
- an adapter having a support and first and second connector elements mounted on said support, said connector elements also being formed as container corner fittings and being spaced from each other so as to correspond to a spacing between said container corner fittings of said gripping devices; and
- connection elements to respectively couple said first and second connector elements of said adapter to said container corner fittings of said gripping devices.

7. A transport vehicle system for a unit load having a flange that includes a pattern of holes, the transport vehicle comprising:
- a towing vehicle and a trailer that are coupled to each other by the unit load during transportation of the unit load; and
- holding devices for the unit load coupled to facing ends of the towing vehicle and the trailer, the holding devices having container brackets arranged to engage gripping portions, shaped as container corner fittings, of gripping devices attached to said unit load, the gripping devices each including an attachment portion having at least two holes with a diameter and spacing that correspond to said pattern of holes of said flange of the unit load, wherein said at least two holes of the attachment portion and corresponding holes of said pattern of holes of said flange are adapted to have connections fitted therein so as to attach said gripping devices to said unit load.

8. The transport vehicle system of claim 7 wherein said container brackets are mounted on telescopically adjustable portions of the holding devices, and wherein a height and lateral position of the container brackets are adapted to be set with the telescopically adjustable portions.

9. The transport vehicle system of claim 8 wherein the holding devices each include two vertically disposed spars and two horizontally disposed traverses arranged in a vertical plane, and wherein at each end of a lower traverse and at upper ends of the two spars one of the telescopically adjustable portions can be telescopically withdrawn and extended, with each telescopically adjustable portion having one of said container brackets coupled to its end.

10. The transport vehicle of claim 7 wherein the towing vehicle and the trailer have matching connector elements at their facing ends, said connector elements being arranged in relation to each other such that the towing vehicle and the trailer can be coupled and driven without the unit load therebetween.

11. The transport vehicle of claim 10 wherein the connector elements include horizontal spars disposed in a direction of travel of the transport vehicle, said spars lying one above the other to couple the towing vehicle and the trailer.

12. The transport vehicle of claim 10 wherein the connector elements include tensioning elements to clamp the towing vehicle and the trailer to each other.

13. A gripping device adapted to grip a unit load having a flange that includes a pattern of holes, the gripping device comprising:
- an attachment portion having at least two holes with a diameter and spacing that correspond to said pattern of holes of said flange of the unit load; and
- a gripping portion formed as a container corner fitting that is adapted to be engaged with and locked into by a handling device.

14. The device of claim 13 wherein said at least two holes of said attachment portion are arranged arcuately to correspond to an arcuate arrangement of said pattern of holes of said unit load.

15. The device of claim 13, further comprising first and second plates located at said attachment portion, and arranged at an angle relative to each other to demarcate an indentation in said attachment portion.

16. The device of claim 13 wherein the gripping portion formed as said container corner fitting is spaced from said at least two holes of said attachment portion, at a distance sufficient to enable said gripping portion to provide a foot for said unit load that extends past an outer contour of said unit load.

17. The device of claim 13 wherein said attachment portion includes a third hole adapted to be attached to an end of a stiffening strut of said unit load.

* * * * *